United States Patent
Westling

[15] 3,662,677
[45] May 16, 1972

[54] MACHINE FOR SHREDDING CHEESE AND FOR DEPOSITING THE CHEESE ONTO PIZZAS

[72] Inventor: Donald E. Westling, 2432 Iva Court, Beloit, Wis. 53511

[22] Filed: Apr. 1, 1970

[21] Appl. No.: 24,654

[52] U.S. Cl..............................................99/450.1, 146/177
[51] Int. Cl.......................................................A21c 5/00
[58] Field of Search....................................107/1–4; 100/93, 100/215 T; 31/5, 28; 146/106, 117, 77, 78, 89; 241/277, 280

[56] References Cited

UNITED STATES PATENTS

| 1,411,634 | 4/1922 | Lambdin | 146/89 |
| 2,277,248 | 3/1942 | Nardi | 146/177 |
| 2,481,336 | 9/1949 | Orlando | 146/177 X |
| 2,793,666 | 5/1957 | Gheiner | 146/177 X |
| 3,502,125 | 3/1970 | Desnick | 146/78 |

Primary Examiner—James R. Boler
Attorney—Wolfe, Hubbard, Leydig, Voit & Osann, Ltd.

[57] ABSTRACT

A block of pizza cheese is shredded by a power-rotated cutter as the cheese is swept upwardly past the cutter. The resulting free falling cheese flakes are spread uniformly across an unbaked pizza by a paddle which swings over the pizza and beneath the cutter as the cheese is moved upwardly.

14 Claims, 8 Drawing Figures

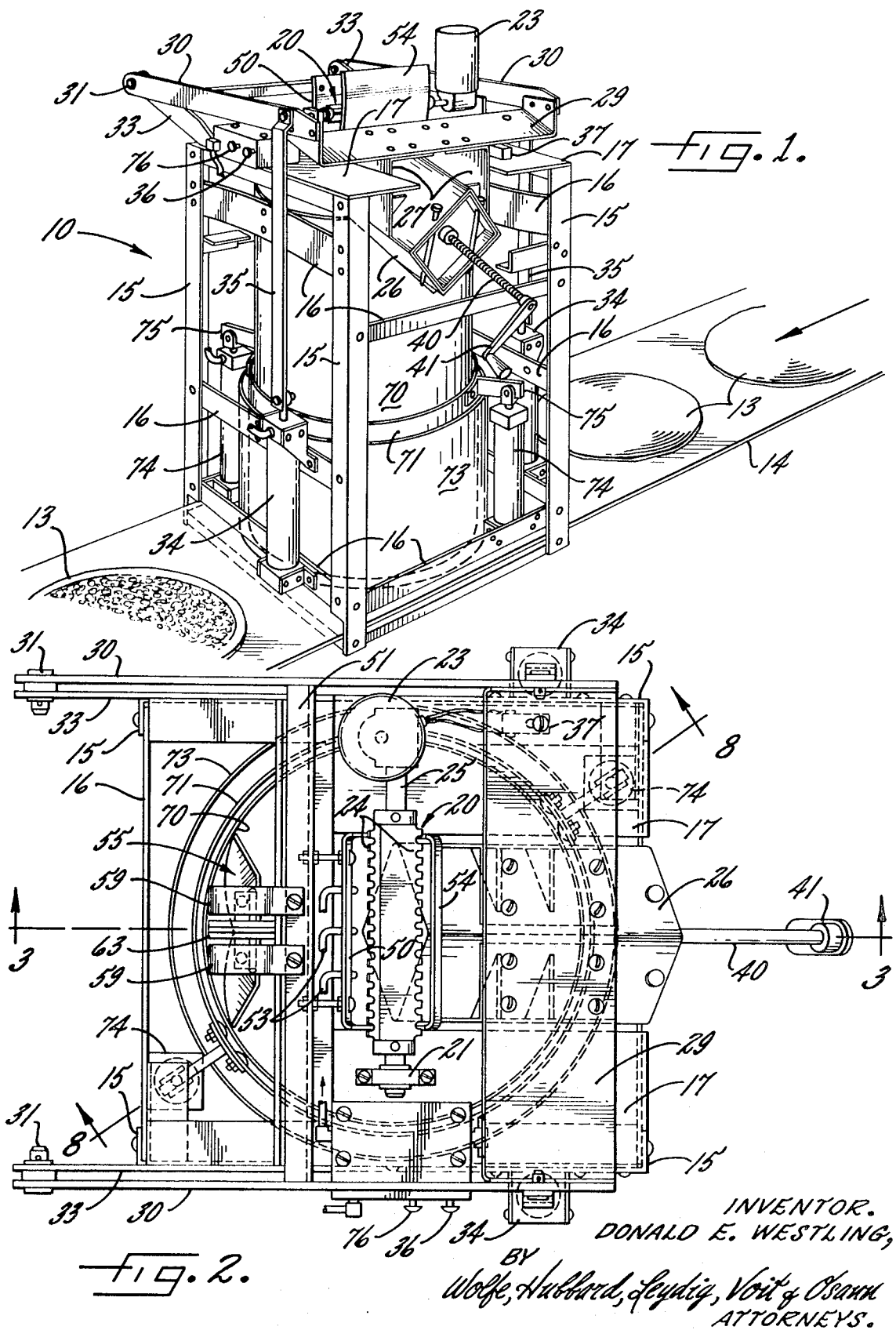

INVENTOR.
DONALD E. WESTLING,
BY
Wolfe, Hubbard, Leydig, Voit & Osann
ATTORNEYS.

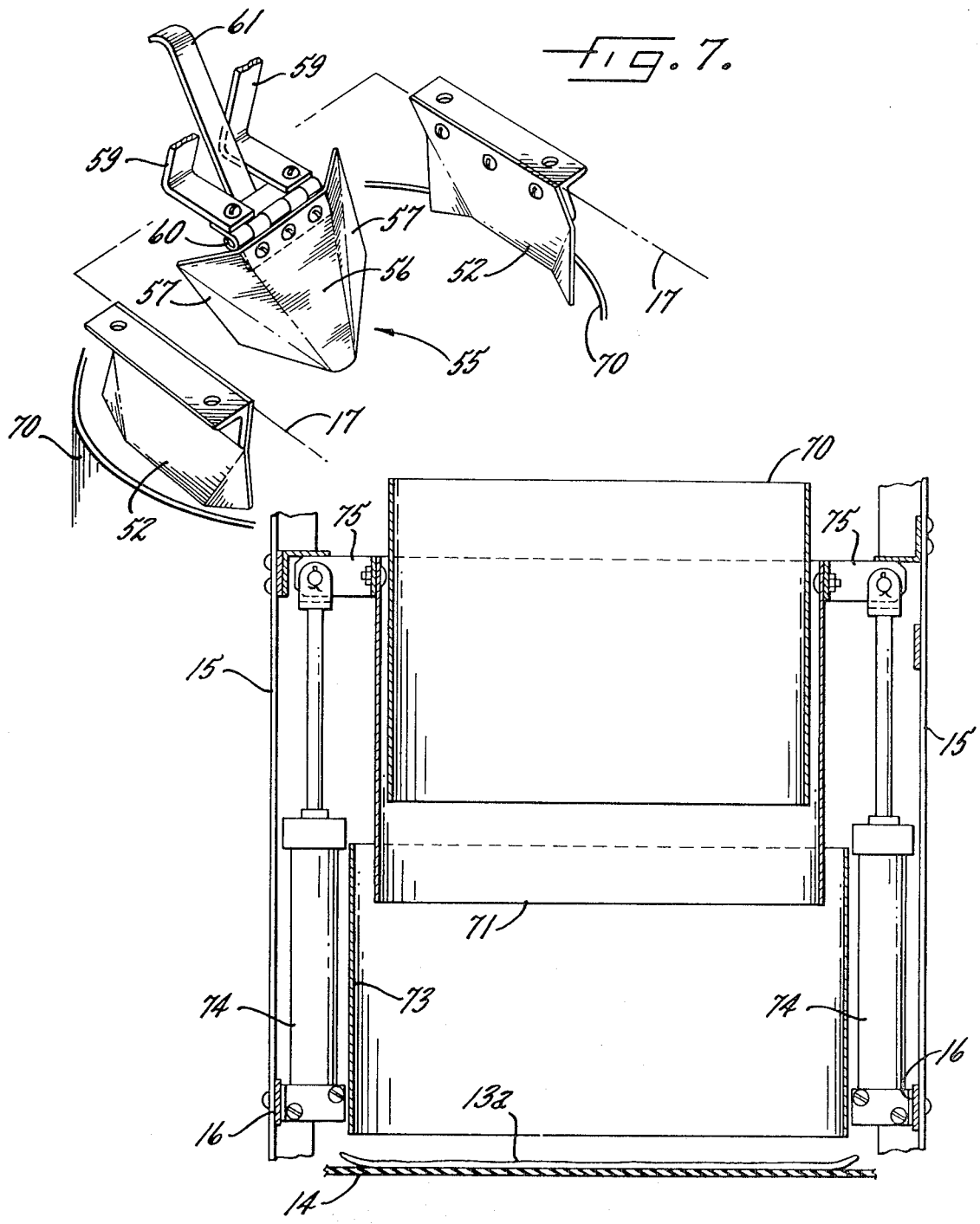

3,662,677

MACHINE FOR SHREDDING CHEESE AND FOR DEPOSITING THE CHEESE ONTO PIZZAS

BACKGROUND OF THE INVENTION

This invention relates to a machine for shredding cheese and for depositing the cheese onto pizzas. More particularly, the invention relates to a machine for shredding block-type pizza cheese.

SUMMARY OF THE INVENTION

The primary aim of the present invention is to provide a new and comparatively simple and inexpensive machine of the above character which is operable to shred the cheese more rapidly and efficiently and to spread the cheese more uniformly across the pizza than has been possible heretofore. In large, these ends are achieved through the provision of a machine in which the cheese is swept past a power-rotated cutter and is shredded into flakes which fall in free flight toward the pizza and are spread across the latter by a deflecting paddle adapted to be swung beneath the cutter and over the pizza in timed relation with the sweeping movement of the cheese.

The invention also resides in the unique orientation of the cheese block relative to the cutter to facilitate uniform distribution of substantially equal amounts of cheese flakes across the entire pizza and in the ease of adapting the machine to handle pizzas of different sizes.

These and other objects and advantages of the invention will become apparent from the following detailed description when taken in conjunction with the accompanying drawings.

BRIEF DESCRIPTION OF THE DRAWINGS

FIG. 1 is a perspective view of a new and improved machine embodying the novel features of the present invention.

FIG. 2 is an enlarged top plan view of the machine shown in FIG. 1.

FIG. 7 is a perspective view of parts shown in FIG. 3.

FIG. 8 is a fragmentary cross-section taken substantially along the line 8—8 of FIG. 2.

DETAILED DESCRIPTION OF THE PREFERRED EMBODIMENT

Figure 3:
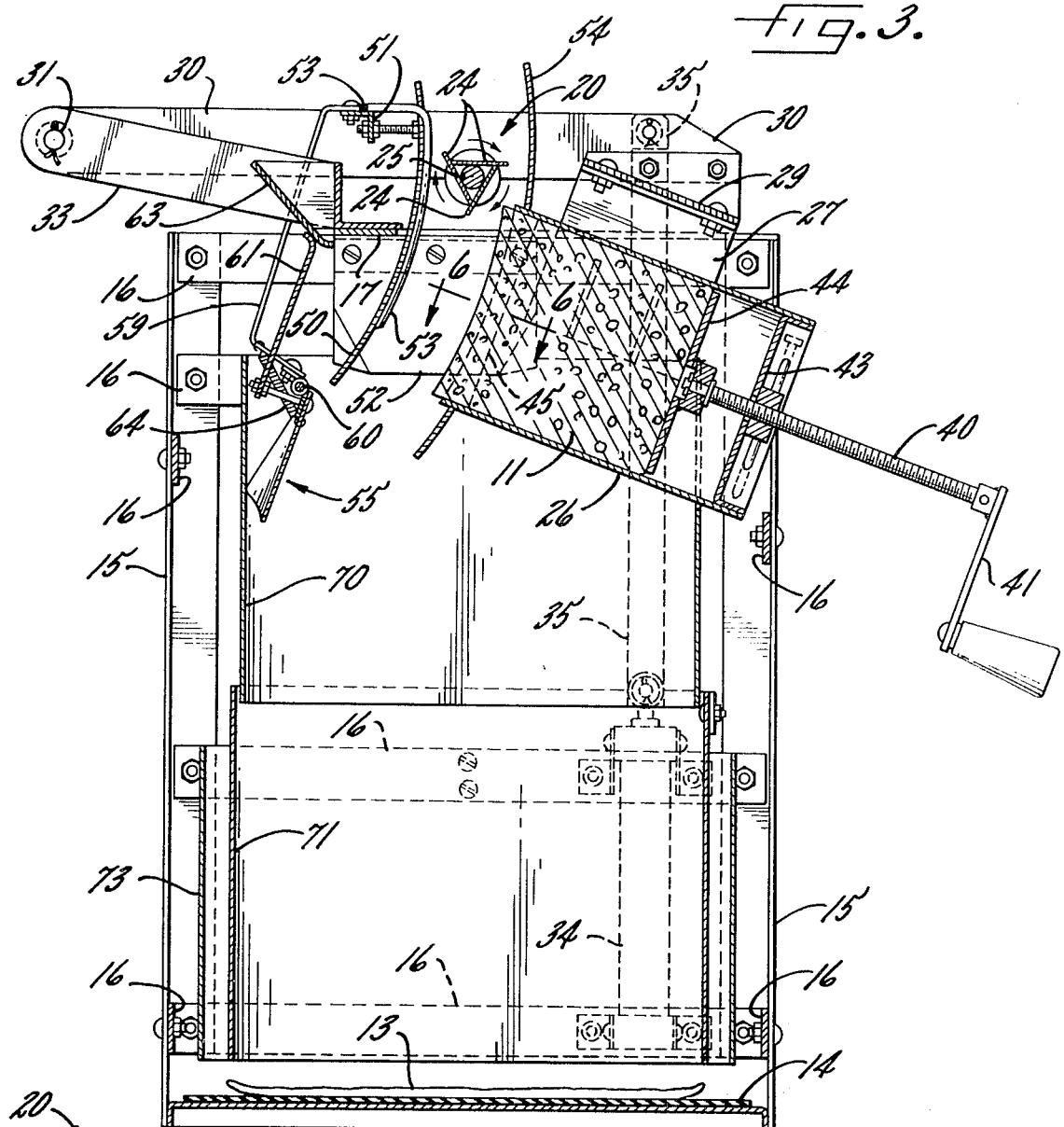
FIG. 3 is a fragmentary cross-section taken substantially along the line 3—3 of FIG. 2.

The present invention is incorporated in a new and improved machine 10 of relatively simple and inexpensive construction for rapidly shredding a block 11 (FIG. 3) of pizza cheese of rectangular cross-section and for automatically and uniformly spreading the resulting cheese flakes across an unbaked pizza 13. The pizzas may be delivered to the machine manually or fed one-by-one beneath the machine along a conveyor 14 as shown in FIG. 1.

The machine 10 includes a frame disposed above the conveyor 14 and formed by four upstanding angle bars 15 interconnected by straps 16 and by a pair of top support plates 17. To shred the cheese 11, a cutter 20 is journaled for rotation about a horizontal axis by a bearing 21 (FIG. 2) on one of the top plates and is power-rotated by an electric motor 23 supported on the other top plate. The cutter includes three angularly spaced blades 24 formed with serrated cutting edges and anchored to a central shaft 25, the latter being connected to the motor.

In order to shave the cheese uniformly off of the block 11 and to promote uniform distribution of the cheese across the entire pizza 13, the cheese and the cutter 20 are moved relative to one another in a novel manner to cause the rotating cutter to sweep across the entire end face of the cheese. While such relative movement could be produced by moving the cutter bodily past the cheese, it herein is effected by swinging the cheese upwardly and downwardly across the cutter while holding the latter at a fixed elevation. Thus, the block of cheese is disposed within a box-like support or casing 26 (FIGS. 1 and 3) which is suspended by brackets 27 from the underside of a plate 29 spanning a pair of arms 30 extending fore-and-aft of the machine 10. The rear ends of the arms are pivoted to swing about horizontally disposed pins 31 which are fastened to brackets 33 projecting upwardly from the top plates 17. Up and down swinging of the arms 30, and thus the cheese 11, is effected by a pair of air cylinders 34 (FIG. 1) fastened to the straps 16 and connected to links 35 which are pivoted to the forward ends of the arms. Actuation of the air cylinders herein is controlled by a hand-operated valve 36 (FIG. 2) supported on one of the top plates.

Figure 4:
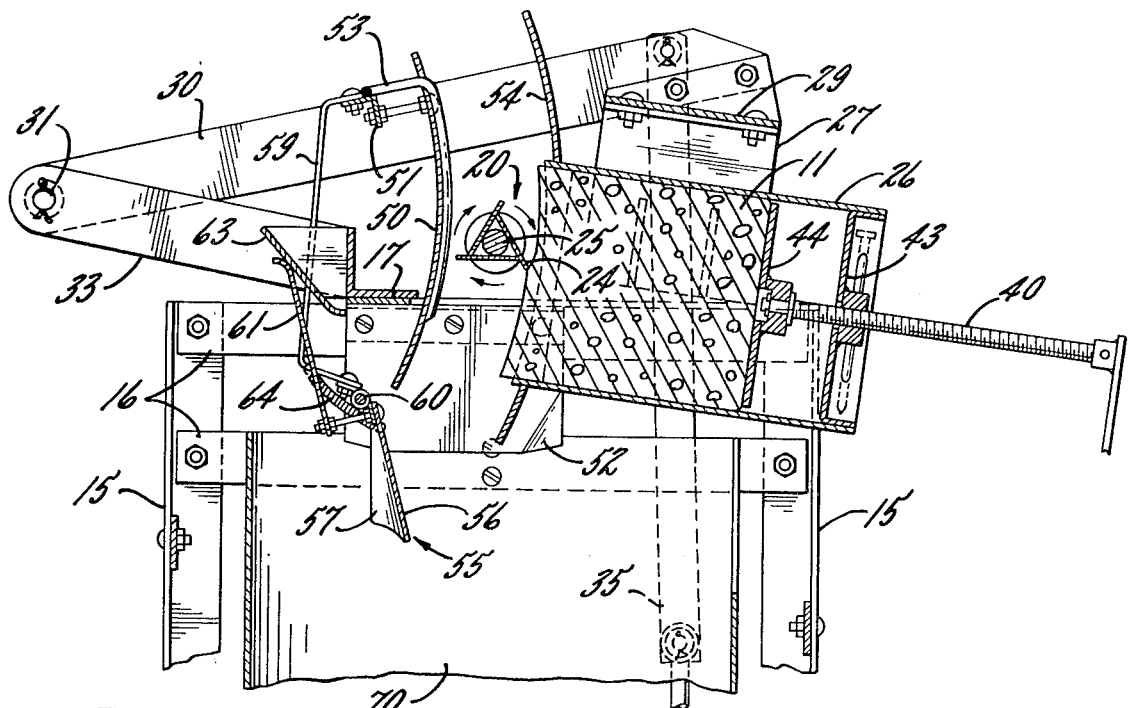
FIG. 4 is a fragmentary view similar to FIG. 3 but showing certain parts of the machine in moved positions.
Figure 5:
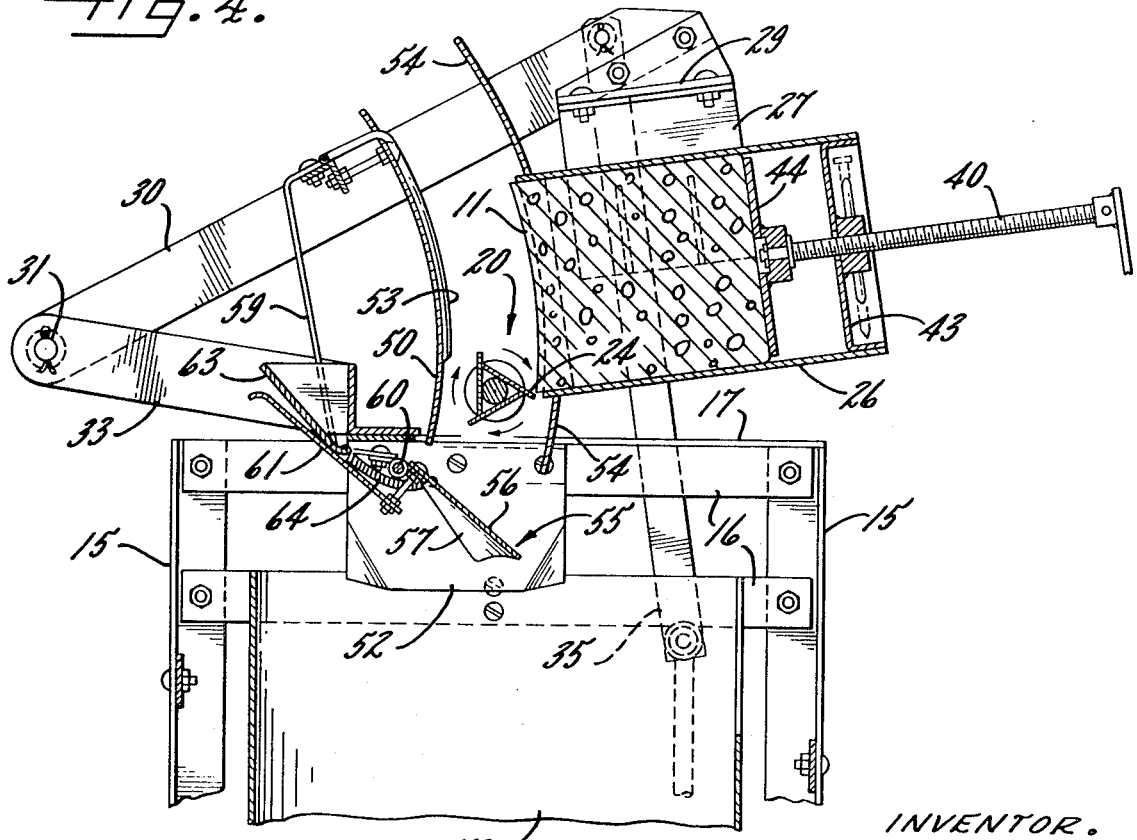
FIG. 5 is a view similar to FIG. 4 but showing the parts in still further moved positions.

Initially, the cheese 11 and the arms 30 are disposed in lowered positions as shown in FIG. 3 with the rear end face of the cheese projecting outwardly a short distance beyond the rear end of the casing 26 and located in a shredding position. With a pizza 13 positioned beneath the cutter 20, the cylinders 34 are actuated to swing the arms and the cheese upwardly, the rear end face of the cheese moving upwardly in a path which curves arcuately about the pins 31. As an incident to the upward swinging of the arms, a spring-biased switch 37 (FIG. 2) underlying the plate 29 is released and energizes the motor 23 to start the cutter rotating in a clockwise direction (FIG. 3). Thus, the cheese sweeps progressively upwardly across the cutter as shown in FIGS. 4 and 5 as the blades 24 rotate past the end face of the cheese and shred the latter into very fine flakes which fall downwardly onto the pizza. The rear end face of the cheese block is shaved uniformly from top to bottom and is left with a concave configuration by virtue of the cheese being swung upwardly past the cutter in an arcuate path. After the upward stroke of the cheese has been completed, the air cylinders 34 are de-actuated to allow the arms 30 and the cheese to return to their lowered positions, the switch 37 being engaged by the plate 29 and de-energizing the motor when the arms are lowered.

Figure 6:
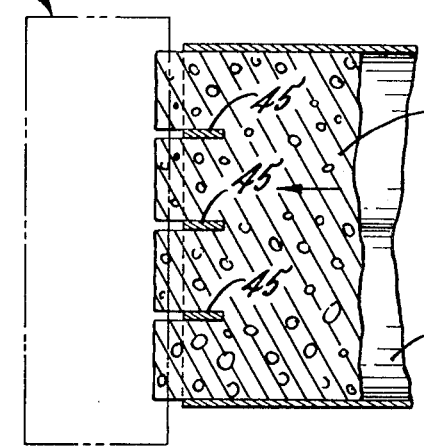
FIG. 6 is a fragmentary cross-section taken substantially along the line 6—6 of FIG. 3.

Before being again swung upwardly past the cutter 20, the cheese block 11 is fed rearwardly toward the cutter a predetermined distance so that additional cheese will be in position to be shredded during the next cutting stroke. For this purpose, a rod 40 (FIG. 3) with a crank 41 on one end thereof is threaded into a plate 43 anchored to the forward end of the casing 26 and is rotatably connected to a pusher 44 which is fitted slidably in the casing in abutment with the forward face of the cheese. By rotating the crank through an appropriate number of turns, the pusher will feed the cheese rearwardly of the casing through the distance necessary to present to the cutter the amount of cheese desired to be spread over the pizza 13. Advantageously, several laterally spaced blades 45 (FIGS. 3 and 6) span the top and bottom walls of the casing adjacent the rear end thereof. The blades slice the rear end face of the cheese block into side-to-side sections as the cheese is fed rearwardly and, more importantly, engage the cheese to prevent the latter from being pulled out of the casing and into the cutter by the rotary motion undertaken by the blades 24 during shredding of the cheese.

An important feature of the invention resides in the uniform spreading of the shredded cheese across the full face of the pizza 13 so that the cheese will be distributed evenly from the center of the pizza to the rim thereof. These ends are achieved in part by a baffle 50 (FIG. 3) which coacts with the cutter 20 to cause the first flakes of cheese shredded by the cutter to be directed to the rear portion of the pizza and which thereafter tends to direct the subsequent flakes from rear to front across the pizza.

As shown most clearly in FIGS. 2 and 3, the baffle 50 is a plate-like member which is connected to a bar 51 spanning the arms 30 and which is located on the side of the cutter 20 opposite the cheese 11. The baffle is curved arcuately about the axis of the pins 31 and thus presents a convex face to the cutter. When the cheese block is in its lowered position (FIG. 3), the lower end of the baffle is directed generally toward the rear of the machine 10 so as to direct the initially shredded cheese onto the rear portion of the pizza 13. The baffle swings upwardly with the cheese block as the latter is raised such that the lower end of the baffle moves into progressively more upright positions (see FIGS. 4 and 5) to help direct the subsequently shredded cheese across the center and forward portions of the pizza. If desired, air tubes 53 (FIGS. 2 and 3) may be spaced across the forward face of the baffle to shoot downwardly directed jets of compressed air therealong for purposes of accelerating the fall of the cheese flakes. Also, a second baffle 54 (FIG. 3) concentric with the baffle 50 preferably is disposed at the forward side of the cutter 20 and is secured to the casing 26 to prevent the cheese flakes from flying forwardly of the machine. The two baffles thus coact with one another to define a chute leading downwardly from the cutter. The sides of the chute are enclosed by guards 52 (FIGS. 3 and 7) which are secured to the top plates 17 to prevent the flakes from escaping laterally of the machine.

Spreading of the cheese flakes uniformly across the pizza 13 is facilitated greatly by a unique paddle 55 (FIGS. 3 and 7) which swings forwardly beneath the baffle 50 as the cheese block 11 is swung upwardly and which deflects the downwardly falling cheese forwardly of the baffle. As shown most clearly in FIG. 7, the paddle comprises a sheet metal member having a central flat portion 56 and two rearwardly diverging wings 57 bent from the central portion. The paddle is located immediately below the baffle and is connected at its upper end to a pair of brackets 59 by a horizontal hinge pin 60, the brackets being suspended from the bar 51. A cam follower 61 (FIG. 3) is connected rigidly to the upper end portion of the paddle 55 and rides along a downwardly and forwardly inclined cam 63 which is fastened to the top plates 17 and held in a stationary position. The follower 61 is pressed against the cam 63 by a contractile spring 64 which is stretched between the paddle and one of the brackets 59 to urge the paddle clockwise about the hinge pin 60.

When the cheese block 11 is in its lowered position shown in FIG. 3, the paddle 55 is inclined slightly rearwardly so as to be nearly in line with the baffle 50. Accordingly, the initially shredded cheese is directed rearwardly onto the rear of the pizza 13 by the baffle and the paddle. As the cheese block 11, the arms 30 and the baffle 50 are swung upwardly, the paddle also is raised (see FIGS. 4 and 5) and, at the same time, is swung counterclockwise about the hinge pin 60 by virtue of the follower 61 riding upwardly along the inclined cam 63. Thus, when the vertical center portion of the cheese block is being shredded by the cutter 20, the paddle is inclined just slightly forwardly as shown in FIG. 4 to direct the cheese flakes falling from the baffle 50 onto the center portion of the pizza. With continued upward swinging of the cheese block, the paddle is swung counterclockwise to progressively increasing forwardly inclined positions (see FIG. 5) to spread the cheese from the center portion of the pizza to the forward portion thereof. Thus, the paddle 55 coacts with the baffle 50 to effect spreading of the cheese across the entire face of the pizza. The diverging wings 57 on the paddle help spread the cheese laterally of the pizza.

To enable the distribution of nearly equal amounts of cheese over each portion of the pizza 13, the cheese block 11 is oriented in a novel manner relative to the cutter 20. That is, the cheese block is arranged such that the rear end face thereof is presented to the cutter as a diamond rather than as a rectangle, one pair of diagonally opposite corners of the block pointing vertically and the other pair pointing horizontally. The block is oriented in this manner simply by positioning the casing 26 as a diamond on the arms 30. With the cheese thus oriented, the cutter, during initial upward swinging of the cheese, shreds only the upper corner of the cheese and, as a result, only a comparatively small volume of flakes are produced when the baffle 50 and the paddle 55 are positioned to direct the flakes to the relatively small chordal area at the rear portion of the pizza. The volume of flakes increases as the cheese moves upwardly and as the paddle swings forwardly to deflect the flakes from the rear of the pizza toward the major diameter of the pizza at the center thereof. When the cheese is at the half way point of its upward stroke, the cutter spans the horizontally pointing corners of the cheese (see FIG. 4) and produces the maximum volume of flakes and, at the same time, the paddle 55 is positioned to deflect the flakes onto the central portion of the pizza and across the major diameter thereof where the most flakes are required. As the cheese moves through the last half of its upward stroke, the volume of flakes produced progressively decreases as the lower corner of the block approaches the cutter and as the paddle swings forwardly to deflect the flakes to the forward portion of the pizza. Thus, the diamond-like orientation of the cheese, being correlated with the circular shape of the pizza, helps insure that equal amounts of cheese are spread over each portion of the pizza.

The machine 10 is easily adaptable to spread the cheese flakes onto pizzas of different sizes. As shown in FIG. 3, the cheese which initially falls from the cutter 20 is confined within an upper sleeve 70 underlying the cutter and anchored rigidly to the straps 16. The upper sleeve has its lower end positioned about midway between the cutter 20 and the pizza and is approximately equal in diameter to the diameter of the smallest pizza adapted to be handled by the machine 10.

Telescoped over the lower end of the upper sleeve 70 is an intermediate sleeve 71 which is disposed in a downward or active position as shown in FIG. 3 when comparatively small pizzas such as 14 inch pizzas are being treated. The intermediate sleeve is just slightly smaller in diameter than a 14 inch pizza and thus confines thd downwardly falling flakes to the small pizza.

When the cheese is to be spread over a larger pizza such as a 16 inch pizza 13a shown in FIG. 8, the intermediate sleeve 71 is shifted upwardly to an inactive position and is retracted out of a larger outer sleeve 73 which is anchored rigidly to the straps 16. Thus, the cheese flakes, instead of being confined by the smaller intermediate sleeve, can spread outwardly to cover the large pizza as permitted by the larger outer sleeve 73. Air cylinders 74 connected between the straps 16 and ears 75 on the intermediate sleeve 70 are used to raise and lower the latter between its active and inactive positions under the control of a hand-operated valve 76 (FIG. 2) located adjacent the valve 36.

From the foregoing, it will be apparent that the present invention brings to the art a new and improved machine 10 which, while being relatively simple in construction and trouble-free in operation, is effective to rapidly and automatically shred pizza cheese into fine flakes and to spread substantially equal amounts of the cheese uniformly across the entire face of the pizza. Also, the machine may be easily converted to handle pizzas of different sizes simply by changing the position of the intermediate sleeve 71 relative to the lower, outer sleeve 73.

I claim:

1. In a machine for shredding cheese and for depositing the cheese onto a pizza, the combination of, a frame, a cheese support mounted on said frame for holding a block of cheese above the pizza, means for feeding said cheese along said cheese support to present one face of the cheese to a shredding position, a cutter support mounted on said frame, a shredding cutter located adjacent said shredding position and said cheese support and mounted on said cutter support to rotate about an axis extending transversely of said one face and the direction of feeding of the cheese, means for power rotating said cutter, and means for moving one of said supports relative to the other of said supports in a direction to sweep said one face of said cheese across and relative to said cutter and thereby shred the cheese.

2. A machine as defined in claim 1 in which said cutter rotates about a generally horizontal axis and in which said one support is moved upwardly and downwardly relative to the other support to sweep said one face of said cheese across and relative to said cutter.

3. A machine as defined in claim 2 further including means mounting said one support for up and down swinging on said frame whereby said one face of said cheese sweeps in an arcuate path across and relative to said cutter.

4. A machine as defined in claim 3 in which said cheese support is the support which is mounted for up and down swinging on said frame.

5. A machine as defined in claim 2 further including means beneath the cutter for spreading the shredded cheese substantially uniformly over the entire pizza.

6. A machine as defined in claim 3 further including a baffle curved generally concentrically with said path and located on the side of the cutter opposite said one face of the cheese to deflect the cheese as the latter is shredded by said cutter, said baffle being carried on and movable with said one support and having a lower end which sweeps at least partially across the pizza and spreads the cheese as said one support is swung relative to the other support.

7. A machine as defined in claim 6 further including a paddle supported on said frame beneath the lower end of said baffle and mounted to swing across the lower end of the baffle about a generally horizontal axis paralleling said one axis so as to deflect the cheese falling from said baffle, and means for swinging said paddle relative to the lower end of said baffle as the latter is moved by said one support thereby to spread the cheese across the pizza.

8. A machine as defined in claim 6 in which said paddle is carried on and moves upwardly and downwardly with said one support, said last-mentioned means acting automatically to swing the paddle across the lower end of the baffle in response to the swinging of said one support.

9. A machine as defined in claim 2 further including a paddle supported on said frame beneath said cutter and mounted to swing back and forth below the cutter about a generally horizontal axis paralleling said one axis so as to deflect the cheese shredded by and falling from the cutter, and means for swinging said paddle relative to the cutter as said one support is moved relative to said other support thereby to spread the cheese across the pizza.

10. A machine as defined in claim 5 in which a sleeve is mounted on said frame below said cutter and extends downwardly toward said pizza, said sleeve being approximately the same diameter as the pizza and being operable to confine the shredded cheese to the pizza.

11. A machine as defined in claim 10 in which a second smaller sleeve is coaxial with said one sleeve, said second sleeve being mounted on said frame for movement between an active position telescoped downwardly within said one sleeve to confine the cheese to a comparatively small pizza, and an inactive position retracted upwardly from said one sleeve to allow the cheese to spread over a larger pizza.

12. A machine as defined in claim 5 in which said block of cheese is rectangular in cross-section, said cheese support including means locating said cheese with one pair of diagonally opposite corners of the block pointing vertically and the other pair of diagonally opposite corners pointing horizontally whereby said block is oriented as a diamond with respect to said cutter.

13. A machine as defined in claim 7 in which said block of cheese is rectangular in cross-section, said cheese support including means locating said cheese with one pair of diagonally opposite corners of the block pointing vertically and the other pair of diagonally opposite corners pointing horizontally whereby said block is oriented as a diamond with respect to said cutter, the movement of said paddle being timed such that said horizontal pointing corners are substantially spanned by said cutter at the time said paddle is positioned to spread the cheese across the major diameter of the pizza.

14. A machine as defined in claim 5 in which said cheese support includes spaced blades at one end thereof extending across the path of advance of the cheese as the latter is fed toward said shredding position, said blades being operable to slice said one face of the cheese into sections and engaging the cheese to prevent the latter from being pulled further along said path by said cutter.

* * * * *